United States Patent

Bye, Jr. et al.

[11] Patent Number: 4,838,341
[45] Date of Patent: Jun. 13, 1989

[54] PRODUCTION OF LOW TEMPERATURE ALUMINUM BASED BRAZING ALLOYS

[75] Inventors: Richard L. Bye, Jr., Morristown; Debasis Bose, Piscataway; Santosh K. Das, Randolph; Amitava Datta, Morris Township, Morris County; Colin M. Adam, Morristown, all of N.J.

[73] Assignee: Allied Signal Inc., Morris Township, N.J.

[21] Appl. No.: 169,123

[22] Filed: Mar. 9, 1988

Related U.S. Application Data

[63] Continuation of Ser. No. 873,277, Jun. 9, 1986, abandoned, which is a continuation of Ser. No. 558,655, Dec. 6, 1983, abandoned.

[51] Int. Cl.⁴ ............................................. B22D 11/06
[52] U.S. Cl. .................................... 164/463; 164/475; 164/423
[58] Field of Search ............... 164/423, 463, 415, 475, 164/429, 427, 479, 158

[56] References Cited

U.S. PATENT DOCUMENTS

| | | | |
|---|---|---|---|
| 4,177,858 | 12/1979 | Liebermann | 164/423 |
| 4,262,734 | 4/1981 | Liebermann | 164/427 |
| 4,718,475 | 1/1988 | Das et al. | 164/415 |

FOREIGN PATENT DOCUMENTS

| | | | |
|---|---|---|---|
| 53-35005 | 9/1978 | Japan | 164/479 |
| 56-62660 | 5/1981 | Japan | 164/423 |
| 56-68558 | 6/1981 | Japan | |
| 7137058 | 8/1982 | Japan | 164/463 |

*Primary Examiner*—Richard K. Seidel
*Attorney, Agent, or Firm*—Gus T. Hampilos

[57] ABSTRACT

Apparatus is provided for fabricating continuous metal strip composed of a low density, readily oxidizable aluminum based alloy. The alloy is cast directly from the metal through a slotted nozzle onto a moving chill substrate. A scraping mechanism located upstream of the nozzle is adapted to ride on the substrate and remove therefrom the gaseous boundary layer associated therewith. Disposed between the scraping mechanism and the nozzle is a gas supply mechanism adapted to introduce a replacement gas that is carried by the substrate to the nozzle. A shielding means configured to form a semi-enclosed chamber around the nozzle and the substrate apparatus to direct and confine the replacement gas in the vicinity of the nozzle. The alloy preferably has the form of a foil and a composition consisting essentially of about 10 to 13 weight percent silicon, 0 to 3 weight percent magnesium, 0 to 4 weight percent copper, 0 to 0.2 weight percent of at least one of bismuth, phosphorous, strontium, lithium, scandium, yttrium, sodium and calcium and 0 to 2 weight percent of at least one of the rare earth elements, the balance being aluminum and incidental impurities.

3 Claims, 4 Drawing Sheets

PRODUCTION OF LOW TEMPERATURE ALUMINUM BASED BRAZING ALLOYS

This application is a continuation of application Ser. No. 873,277, filed June 9, 1986 which is a continuation of 558,655 filed Dec. 6, 1983, both now abandoned.

BACKGROUND OF THE INVENTION

1. Field of the Invention

This invention relates to aluminum based metal alloys and more particularly to a ductile brazing foil useful for brazing metal articles such as those of aluminum and aluminum alloys and a method for making them.

2. Description of the Prior Art

Brazing is a process of joining metal parts, often of dissimilar composition, to each other. Typically, a filler metal that has a melting point lower than that of the metal parts to be joined together is interposed between the metal parts to form an assembly. The assembly is then heated to a temperature sufficient to melt the filler metal. The molten filler metal reacts with the parts to be joined so that when cooled a strong joint is formed.

Filler metals used are commonly in powder, wire, or foil form depending on the alloy composition and the specific application. The filler metals are often used in conjunction with fluxes and the process may be carried out in inert atmosphere or vacuum, again depending on the filler metal composition and the specific application. The foil form of filler metal provides the advantage of preplacing a controlled amount of filler metal in the joint area, thus permitting brazing of complex shapes with minimum rejection.

Filler metals for brazing of aluminum and aluminum alloys are aluminum-silicon alloys containing 7 to 13 wt % silicon and are designated AWS BA1Si. Liquidus, solidus and brazing temperatures of these alloys decrease with increasing silicon content up to about 12.5 wt %. It has been proposed that these alloys contain up to 3 wt % Mg for fluxless furnace brazing. However, alloys containing high silicon and magnesium contents are extremely difficult to make in foil form because they are brittle and do not respond well to the multiple rolling and annealing cycles necessary to produce foil from ingots or slabs. Filler metal foils are currently limited to relatively low silicon contents of less than 10 wt % with magnesium contents of up to 1 wt %, or to very low magnesium content (0.5 wt %) with more desirable silicon contents. In any case, because of the inherent limitations in the casting and rolling processes, silicon containing particle, hereinafter called silicon particle, size is limited to a minimum of approximately 1 μm and is more typically of the order of 5 μm. Brazing foils with uniformly dispersed silicon particles of less than 1 μm are more desirable than those with large particles. In the commercially available brazing foils there tends to be a relatively heavy oxide film present on the surfaces which is an impediment to the brazing process.

An alternative to filler metal foil is known as brazing sheet. Brazing sheet consists of a brazeable aluminum alloy roll bonded or clad on one or both sides with a brazing alloy of the desired composition.

The limitations in the use of brazing sheet include the increased costs involved in the manufacturing of it. Additionally, there is a minimum thickness of approximately 0.025" for such sheets. The relatively thick sheets, in turn, result in silicon diffusion into the core, which limits the amount of filler metal available for joint formation.

There remains a need in the art for an aluminum brazing alloy with a high silicon content and high magnesium content, the silicon particles being finely dispersed, for low brazing temperatures in fluxless brazing processes. It would be particularly desirable if such aluminum brazing alloy were available in foil form with a minimum oxide film thickness.

U.S. Pat. No. 4,142,571 teaches a method for making continuous polycrystalline or amorphous strips of considerable width (greater than 7 mm) directly from the melt by forcing molten metal onto the surface of a moving chill body under pressure through a slotted nozzle located in close proximity to the surface of the chill body. Because of the density, fluidity, and strong tendency for oxidation of aluminum alloys, it has been found that it is very difficult to maintain melt flow uniformity for long times and therefore produce large quantities of aluminum alloy ribbon suitable for brazing applications with the method as disclosed by Narasimhan in U.S. Pat. No. 4,142,571. There is, therefore, a need for an improved process that would make the production of aluminum brazing foils in commercial quantities possible.

SUMMARY OF THE INVENTION

The present invention provides a method for making ductile ribbons of aluminum based metal alloys having a form and composition particularly suited for use as brazing foils in fluxless brazing processes.

Generally stated, the composition consists essentially of about 9 to 13 weight percent silicon, 0 to 3 weight percent magnesium, 0 to 4 weight percent copper, 0 to 0.2 weight percent of at least one element selected from the group consisting of bismuth, strontium, lithium, scandium, yttrium, calcium, phosphorous, sodium and 0–2 weight percent of at least one of the rare earth elements, the balance being essentially aluminum and incidental impurities.

The addition of silicon depresses the melting point of the alloy, while the addition of magnesium enhances wetting and promotes good filler metal flow in fluxless brazing processes. The other elements named act in the same manner as magnesium does in influencing the filler metal flow and, in addition, refine the microstructure of the brazed joint thereby improving the ductility and mechanical properties of the joint.

In addition, the invention provides a ductile foil with a microstructure typical of that obtained with rapid solidification rates containing very fine and uniformly distributed silicon particles. Said foil with compositions as stated above, is suitable for use in brazing applications, especially in fluxless brazing processes, in its as-cast state requiring no subsequent processing other than cutting into a desired preform shape.

The ductile brazing foil of the invention is fabricated by a process which comprises forming a melt of the desired composition and quenching the melt on a moving chill body at a rate of at least $10^5$ °C./sec. That process further comprises the provision of a means to protect the melt puddle from excessive oxidation and physical disturbance by the air boundary layer carried with the moving substrate. Said protection is provided by a shrouding apparatus which serves the dual purpose of containing a reducing gas, such as CO or an inert gas, around the nozzle while excluding extraneous wind currents which may disturb the melt puddle.

Further, there is provided in accordance with the invention, an improved process for joining two or more metal parts by brazing. The process comprises:

(a) interposing a filler metal between the metal parts to form an assembly, the filler metal having a melting temperature less than that of any of the metal parts, (b) heating the assembly in a vacuum of $1 \times 10^{-3}$ Torr or lower or in a reducing atmosphere to at least the melting temperature of the filler metal; and (c) cooling the assembly.

The improvement comprises employing, as the filler metal, a ductile aluminum foil that has the compositions given above. Advantageously, such compositions are not currently available in this form. In addition, the foils of the invention contain a distribution of silicon particles that are significantly smaller than those in currently available brazing foil for this purpose. Furthermore, the thickness of the oxide layer in the foils of the present invention is less than in the commercially available brazing foils, thus making the brazing process easier.

The filler metal foil is easily fabricable with this invention as ductile ribbon that can be used in the as-cast form. Advantageously, the aluminum based metal foil can be stamped into complex shapes to provide braze preforms.

Advantageously, the homogeneous, ductile foil of the invention can be placed in the joint prior to the brazing operation.

BRIEF DESCRIPTION OF THE DRAWINGS

The invention will be more fully understood and further advantages will become apparent when reference is made to the following detailed description and the accompanying drawings, in which.

DETAILED DESCRIPTION OF THE INVENTION AND THE PREFERRED EMBODIMENTS

Figure 1:
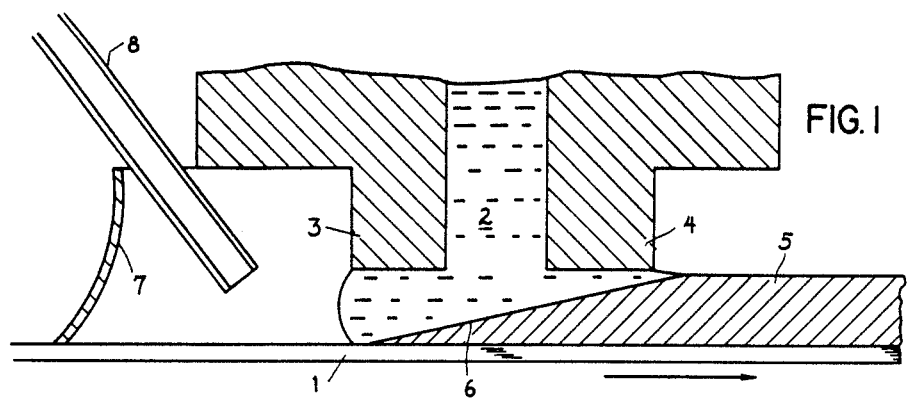
FIG. 1 is a side cross section illustrating the relationship between the substrate, scraper, the inert or reducing gas inlet, and the nozzle through which metal is deposited on the moving chill surface.

FIG. 1 shows a partial cross sectional side view illustrating the method by which the brazing foils of the present invention are cast. As shown in FIG. 1, molten metal 2 of the desired composition is forced under pressure through a slotted nozzle defined by a first lip 3 and a second lip 4 onto the surface of a chill body 1 which is held in close proximity to the nozzle and moves in the direction indicated by the arrow. A scraping means including scraper 7 is located in contact with the chill substrate and an inert or reducing gas is introduced by a gas supply means through a gas inlet tube 8.

Figure 2:
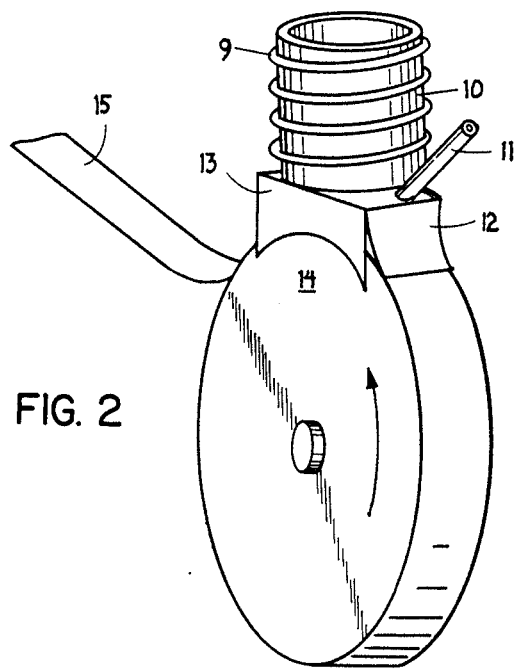
FIG. 2 is a perspective view illustrating a manner of arrangement of the substrate scraper and the side shields which arrangement provides a semi-enclosed chamber that directs and confines the inert or reducing gas in the vicinity of the nozzle opening.
Figure 3:
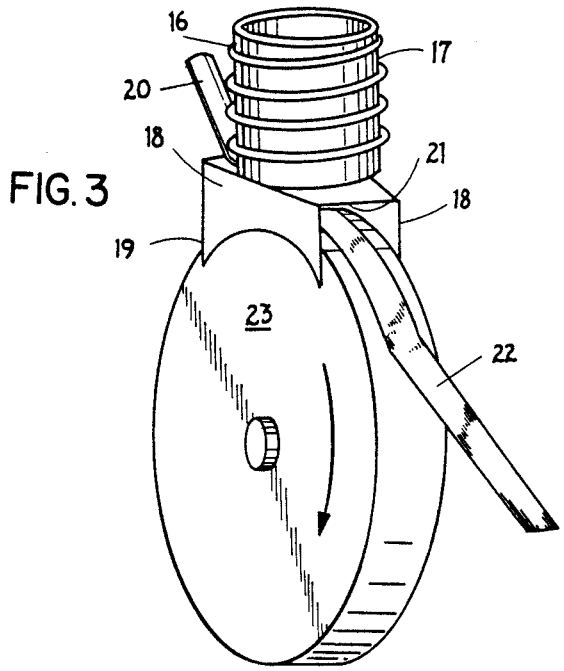
FIG. 3 is a perspective view, taken from the side opposite to that shown in FIG. 2, illustrating the substrate scraper and side shields arrangement.

FIGS. 2 and 3 are simplified perspective views from two different angles showing, with reference to FIG. 3 how side shields 18 are used in conjunction with the scraper 19 and the gas inlet tube 20, to provide a semi-enclosed chamber around the nozzle 21.

It has been found that the preferred protective gas is carbon monoxide, although other gases such as helium, nitrogen or argon can be used. The advantage of using Co is that it burns, combining with oxygen present around the nozzle to produce hot $CO_2$. The process reduces the oxygen available for alloy oxidation, keeps the nozzle hot and produces a gas of lower density than air to impinge on the melt puddle.

In addition it has been found that the presence of the scraper and side shields markedly improves the effectiveness of the CO flame. Without the scraper, the CO tends to burn downstream of the nozzle only, with the result that if ribbon is formed at all it is thin and full of holes, indicating poor melt/substrate contact. With a scraper the flame burns upstream of the nozzle and of the gas inlet tube, indicating the effectiveness of the scraper in removing the air boundary layer and, therefore, creating a low pressure area behind it which is filled by the protective gas. Without side shields, however, extraneous wind currents generated by the moving substrate assembly, can distort the gas flow so that it does not uniformly impinge upon the nozzle and melt puddle. Under these conditions, the ribbon is apt to be formed non-uniformly. In particular, one or both ribbon edges tend to be irregular. It has been found, however, that when side shields are used in conjunction with the scraper blade and protective gas, the gas flow pattern is uniform and consistent and ribbon can be cast reliably.

The precise dimensions and location of the scraping means, gas supply and shielding means are not critical, but it has been found that several general concepts should be adhered to. The scraping means, gas supply and shielding portions of the casting apparatus, that is, the side shields, scraper blade, and gas inlet tube should be located to ensure that a uniform gas flow pattern is maintained. In general, the opening of the gas inlet tube should be located within 2 to 4 inches of the nozzle. The scraper should be positioned as close as is practical to the gas inlet tube to ensure that the protective gas flows into the low pressure area behind it and not the ambient atmosphere. The side shields should be located so that they extend from the scraper to a point roughly 2 to 3 inches past the nozzle slot. The shields should be of a height such that they are close to or in contact with the substrate assembly at the bottom and the underside of the nozzle or nozzle support at the top. The nozzle or nozzle support should be such that when it is in the casting position, the scraper, the side shields and the underside of the nozzle support form a semi-enclosed chamber around the nozzle slot which maximizes the effect of the inert or protective gas, as shown in FIGS. 2 and 3.

The alloys cast according to this invention are rapidly solidified ribbons which cool at a rate in excess of $10^5 °C./sec$. This process produces material suitable for use as brazing foil in the as-cast condition with lower oxygen content and a smaller silicon particle size than is possible in aluminum brazing foils produced by other techniques and is suitable for alloy compositions which are highly desirable for brazing but that cannot be made into foils by other techniques.

The following examples are presented in order to provide a more complete understanding of the invention. The specific techniques, conditions, materials and reported data set forth to illustrate the invention are exemplary and should not be construed as limiting the scope of the invention.

EXAMPLES 1-10

Ribbons were cast in accordance with the procedure described above by using an over pressure of argan to force molten aluminum alloy through slotted nozzle onto a water cooled copper alloy wheel rotated to produce surface speeds of between about 900 m/min and 1500 m/min. Ribbons are 2.5 cm wide and vary from about 25 to 85 μm thick.

The nominal compositions of the alloys based on the charge weight added to the melt are summarized in Table 1. The liquidus and solidus temperatures were determined by differential thermal analysis and are listed in Table 1. As a simple measure of ductility, samples of the ribbon were bent between the piston and the anvil of a micrometer until they cracked. The bend radius as determined from the micrometer reading when the crack occurred is listed in Table 1. The smaller the bend radius the more ductile is the ribbon.

As shown in Table 1, alloys of this invention with high silicon contents and therefore low liquidus and solidus temperatures and high magnesium contents which is desirable in fluxless brazing processes have been cast into thin foils that can be easily handled and formed as brazing preforms, as indicated by the small minimum bend radius.

TABLE 1

| | Composition, Solidus and Liquidus Temperatures, and Minimum Bend Radius of As-Cast 2.5 cm Wide Ribbons | | | | | | |
|---|---|---|---|---|---|---|---|
| | Alloy Composition (wt %) | | | | Solidus Temperature (°C.) | Liquidus Temperature (°C.) | Minimum Bend Radius (cm) |
| Example | Al | Si | Mg | Others | | | |
| 1 | 88.0 | 10.0 | 2.0 | — | 552 | 606 | 0.11 |
| 2 | 88.5 | 11.0 | 1.5 | — | 549 | 600 | 0.05 |
| 3 | 85.0 | 11.0 | 1.0 | 3.0 Cu | 503 | 590 | 0.08 |
| 4 | 86.0 | 12.0 | 2.0 | — | 548 | 605 | 0.08 |
| 5 | 85.0 | 12.0 | 3.0 | — | 544 | 606 | 0.16 |
| 6 | 86.96 | 12.0 | 1.0 | 0.04-Bi | 551 | 601 | 0.10 |
| 7 | 85.97 | 13.0 | — | — | 547 | 600 | 0.04 |
| 8 | 85.0 | 12.0 | 2.0 | 1-R.E. | 544 | 600 | 0.16 |
| 9 | 85.0 | 13.0 | 2.0 | — | 548 | 602 | 0.08 |
| 10 | 90.0 (Commercial 4004) | 9.5 | 0.5 | — | 559 | 617 | 0.01 |

EXAMPLES 11 and 12

Figure 4:
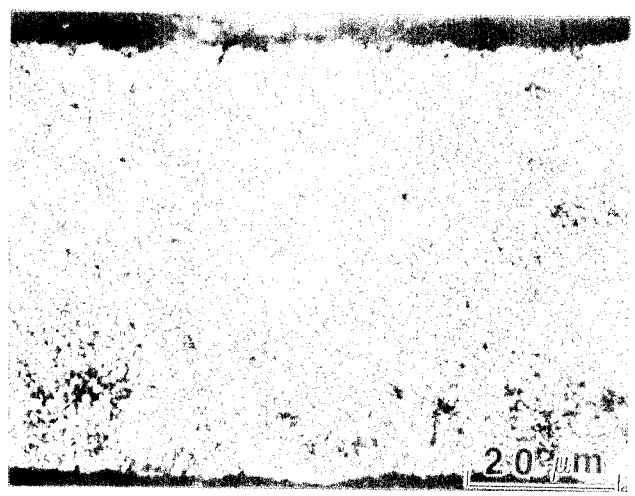
FIG. 4 is an optical micrograph of a cross section of an as-cast 85 wt % Al-13 wt % Si-2 wt % Mg foil.

Some of the ribbon samples were cut, mounted, polished and etched using standard metellographic techniques for examination of the microstructure by optical microscopy. FIG. 4 is a micrograph of a representative sample having the composition 85 wt % Al, 13 wt % Si and 2 wt % Mg. The structure is of a very fine scale typical of these alloys solidified at greater than 10⁵°C./sec. The silicon particle size is so small that individual silicon particles cannot be distinguished at magnifications associated with optical microscopy. Transmission electron microscopy examination showed the silicon particles to be less than 0.002 μm.

Figure 5:
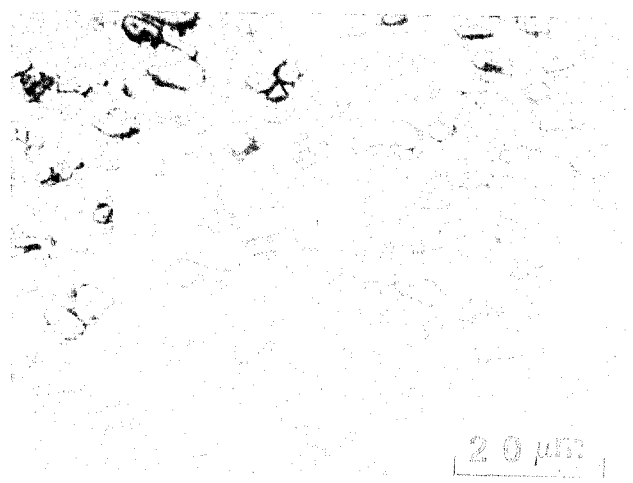
FIG. 5 is an optical micrograph of a cross section of a commercial alloy foil having AWS designation 4004, the composition of the alloy being 90 wt % Al-9.5 wt % Si-0.5 wt % Mg.

For comparative purposes a sample of a commercially available aluminum brazing foil designated as alloy 4004 and containing 9.5 wt % Si and 0.5 wt % Mg with the balance being Al was prepared in the same manner. FIG. 5 is a micrograph of a cross section of that sample. It exhibits a microstructure characteristic of a foil prepared by a succession of rolling and annealing treatments. In particular it contains distinct silicon particles with an average size of about 2.5 μm.

EXAMPLES 13-15

The oxide film thickness of two of the foils of the present invention and of a commercially available foil produced with conventional methods was determined using combinations of Auger Electron Spectroscopy (AES) in conjunction with inert gas sputtering and Electron Spectroscopy for Chemical Analysis (ESCA). Both these techniques are commonly used for surface analysis, the AES/inert gas sputtering being destructive whereas ESCA gives non-destructively, in-depth composition information. The nominal alloy compositions and the oxide film thickness are listed in Table 2.

TABLE 2

| | Brazing Foil Composition and Oxide Film Thickness As Determined by AES/ESCA Analysis | | | |
|---|---|---|---|---|
| | Alloy Composition (wt %) | | | Oxide Film Thickness (μm) |
| Example | Al | Si | Mg | |
| 13 | 87.5 | 11.0 | 1.5 | 0.0075 |
| 14 | 85.0 | 13.0 | 2.0 | 0.0075 |
| 15 | 90.0 (commercial Alloy 4004) | 9.5 | 0.5 | 0.015 |

EXAMPLES 16 and 17

Lap shear test specimens were prepared according to AWS C˙3.2 "Standard Method for Evaluating the Strength of Brazed Joints". Aluminum sheet (commercially designation 1100), 3.175 mm (0.125") thick was used as the base metal. Ribbons of selected compositions having dimensions of about 25 μm to 85 μm thick and about 25.4 mm (1") wide were used as the filler metal. Brazed joints were of the lap type with lap dimension carefully controlled to 6.35 mm (0.25"). Prior to brazing, the aluminum metal was cleaned in the following manner: degreased in acetone, chemically etched for 45-60 seconds in 10% HNO₃+1% HF solution followed by rinsing in water and alcohol and then drying in air. However, the filler metal was used as-cast without any treatment. Lap joints containing selected brazing ribbons of the invention were then assembled by laying ribbons side by side to cover the entire length of the lap joint. Specimens were then clamped and heated to the brazing temperature inside a vacuum furnace.

For comparative purposes identical joints were prepared using 100 μm thick commercial 4004 foil. In this case no brazed joint could be prepared without first removing the oxide layer from the brazing foil by severe pickling in acid solution. On the other hand the brazing foils of the present invention did not require any prior treatment. This emphasizes the importance of the thin oxide layer observed (Table 2) in foils of the present invention.

The compositions of the brazing foil, brazing temperature and mechanical properties of brazed joints having an overlap of 12.7 mm (0.5") are listed in Table 3. All brazing was done in a vacuum of $2 \times 10^{-5}$ Torr for 2 mins at 630° C.

TABLE 3

Composition, Brazing Temperature and Mechanical Properties of the Brazed Joints

| Example | Alloy Composition (weight %) | | | | Shear Strength MPa (ksi) | Tensile Strength (MPa) | Area of Failure |
| --- | --- | --- | --- | --- | --- | --- | --- |
| | Al | Si | Mg | Bi | | | |
| 16 | 86.96 | 12.0 | 1.0 | 0.04 | 45 (6.48) | 90 (12.96) | Base metal |
| 17 | 90.0 (Commercial Alloy 4004) | 9.5 | 0.5 | — | 44 (6.32) | 87 (12.64) | Base metal |

While the invention has been described with particular reference to the preferred embodiments, numerous modifications of the alloys containing other minor elements can lead to similar results as can be realized by those skilled in the art.

Having thus described the invention, in rather full detail, it will be understood that such detail need not be strictly adhered to but that obvious changes and modifications may suggest themselves to one skilled in the art. It is accordingly intended that all matter contained in the above description and shown in the accompanying drawings shall be interpreted as illustrative and not in a limiting sense.

What is claimed is:

1. A process for continuously casting metal strip composed of a low density, readily oxidizable aluminum alloy, the process comprising the steps of feeding a melt of said alloy through a slotted nozzle arranged proximate a moving chill substrate to deposit the melt on said substrate for solidification into a strip, the improvement which comprises in combination:
   (a) providing scraping means located upstream of said slotted nozzle to cooperate with said substrate to remove from the substrate any gaseous boundary layer associated therewith and to create a region between said scraping means and said nozzle of reduced pressure;
   (b) supplying a combustible gas at a location between said scraping means and said slotted nozzle;
   (c) igniting said gas to produce a reduced density atmosphere upstream of said nozzle, which atmosphere is then carried on said substrate to said nozzle; and
   (d) providing a shielding means cooperating with said scraping means and a portion of said moving surface to define a semi-enclosed chamber surrounding said nozzle, said shielding means comprising side walls extending in a direction of movement of said moving substrate from said scraping means to a location downstream of said nozzle.

2. The method of claim 1, wherein the shielding means further comprises a front wall located downstream of said nozzle and cooperating with said side walls and said scraping means to define a four-sided enclosure.

3. The method of claim 2, wherein the shielding means further includes a top wall associated with said nozzle, which top wall cooperates with the scraper means, side walls and front wall to define an essentially totally enclosed containment area within which the gas is maintained.

* * * * *